(12) United States Patent
Ueno

(10) Patent No.: US 9,122,257 B2
(45) Date of Patent: Sep. 1, 2015

(54) THREAD CUTTING MACHINE

(71) Applicant: OKUMA Corporation, Oguchi-cho, Niwa-gun, Aichi (JP)

(72) Inventor: Shigeki Ueno, Niwa-gun (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 14/042,841

(22) Filed: Oct. 1, 2013

(65) Prior Publication Data

US 2014/0094953 A1    Apr. 3, 2014

(30) Foreign Application Priority Data

Oct. 1, 2012    (JP) ................................ 2012-219460

(51) Int. Cl.
*G06F 19/00* (2011.01)
*G05B 15/02* (2006.01)
*G05B 19/416* (2006.01)

(52) U.S. Cl.
CPC ............ *G05B 15/02* (2013.01); *G05B 19/4163* (2013.01); *G05B 2219/43129* (2013.01)

(58) Field of Classification Search
CPC ...... G05B 19/182; G05B 19/416; B23G 1/00; B23G 1/02; B23G 1/04
USPC .................. 700/139, 160, 173, 186, 188, 193
See application file for complete search history.

(56) References Cited

U.S. PATENT DOCUMENTS

| 4,789,943 | A | * | 12/1988 | Yamanaka et al. | 700/186 |
| 4,879,660 | A | * | 11/1989 | Asakura et al. | 700/173 |
| 5,132,912 | A | * | 7/1992 | Ito et al. | 700/160 |
| 5,404,308 | A | * | 4/1995 | Kajiyama | 700/188 |
| 6,147,468 | A | * | 11/2000 | Hamamura et al. | 318/625 |
| 6,847,857 | B2 | * | 1/2005 | Sugie | 700/160 |
| 7,039,493 | B2 | * | 5/2006 | Endou et al. | 700/188 |
| 2005/0246053 | A1 | * | 11/2005 | Endou et al. | 700/188 |
| 2006/0210370 | A1 | * | 9/2006 | Mizukami et al. | 700/159 |
| 2007/0241710 | A1 | * | 10/2007 | Shibui et al. | 318/552 |
| 2011/0218666 | A1 | * | 9/2011 | Sugie et al. | 700/160 |

FOREIGN PATENT DOCUMENTS

| JP | 2004-209558 A | 7/2004 |
| JP | 2012-056066 A | 3/2012 |

* cited by examiner

*Primary Examiner* — Nathan Durham
(74) *Attorney, Agent, or Firm* — McCarter & English, LLP

(57) ABSTRACT

A thread cutting machine for cutting a thread by rotating a main spindle and moving a feed axis includes a main-spindle speed computing section that computes and outputs a rotation speed of the main spindle based on a main-spindle rotation speed instruction for each thread cutting pass, and an acceleration/deceleration time computing section that computes and outputs an acceleration/deceleration delay time of the feed axis for each thread cutting pass so that a product of multiplication of the acceleration/deceleration delay time of the feed axis and the rotation speed of the main spindle is the same for all thread cutting passes.

1 Claim, 5 Drawing Sheets

THREAD CUTTING MACHINE

CROSS-REFERENCE TO RELATED APPLICATION

This application claims priority under 35 U.S.C. §119(a)-(d) to Japanese Patent Application No. 2012-219460, filed Oct. 1, 2012, the content of which is hereby incorporated by reference in its entirety as part of the present disclosure.

FIELD OF THE INVENTION

The present invention relates to a thread cutting machine for cutting a thread by rotating a main spindle and feeding the main spindle relatively in an axial direction for cutting.

BACKGROUND OF THE INVENTION

Known methods for suppressing chattering vibrations during thread cutting have been disclosed in JP 2004-209558A and JP 2012-56066A. These methods suppress chattering vibrations by changing rotation speed of a main spindle during thread cutting.

In the technique disclosed in JP 2004-209558A, a relative phase error between a main spindle position and a feed axis position during thread cutting is computed at the main spindle position, and the relative phase error is compensated relative to the main spindle position to provide a pseudo main spindle position based on which a movement of the feed axis is computed.

In the technique disclosed in JP 2012-56066A, a time constant, an acceleration/deceleration type, and a positional loop gain are made the same for a main spindle and a feed axis to eliminate a phase error between the main spindle and the feed axis relative to a change of rotation speed of the main spindle.

Both methods disclosed in JP 2004-209558A and JP 2012-56066A are techniques for changing the rotation speed of the main spindle. In this case, it is also necessary to change the speed of the feed axis to provide a constant thread pitch.

In the method disclosed in JP 2004-209558A, however, the acceleration/deceleration time of the feed axis is not changed, so that an amount of acceleration/deceleration delay of the feed axis is changed depending on the speed of the feed axis.

In the method disclosed in JP 2012-56066A, multi-stage acceleration/deceleration can be applied depending on the rotation speed of the main spindle, with the acceleration/deceleration time being longer in a higher speed range. Therefore, as in the method disclosed in JP 2004-209558A, the amount of acceleration/deceleration delay of the feed axis is also changed depending on the speed of the feed axis, with variation of the delay amount being larger than that in JP 2004-209558A.

If the amount of acceleration/deceleration delay of the feed axis is changed according to the speed of the feed axis as mentioned above, a cutting amount may be increased at a thread-cutting-direction changing part, such as a connecting part of thread cutting. Accordingly, there may be a risk of damaging tools due to unexpectedly large cutting load.

SUMMARY OF THE INVENTION

It is an object of the present invention to provide a thread cutting machine capable of maintaining a constant cutting amount even if a rotation speed of a main spindle is changed.

According to the present invention, a thread cutting machine for cutting a thread by rotating a main spindle and moving a feed axis includes a main-spindle speed computing section that computes and outputs a rotation speed of the main spindle based on a main-spindle rotation speed instruction for each thread cutting pass, and an acceleration/deceleration time computing section that computes and outputs an acceleration/deceleration delay time of the feed axis for each thread cutting pass so that a product of multiplication of the acceleration/deceleration delay time of the feed axis and the rotation speed of the main spindle is the same for all thread cutting passes.

According to the present invention, the same amount of acceleration/deceleration delay, d, can be provided for all thread cutting passes even if the rotation speed of the main spindle is changed, so that a constant cutting amount can be maintained.

BRIEF DESCRIPTION OF THE DRAWINGS

Preferred embodiment(s) of the present invention will be described in detail based on the following figures, wherein.

DETAILED DESCRIPTION OF EMBODIMENTS OF THE INVENTION

Figure 7:
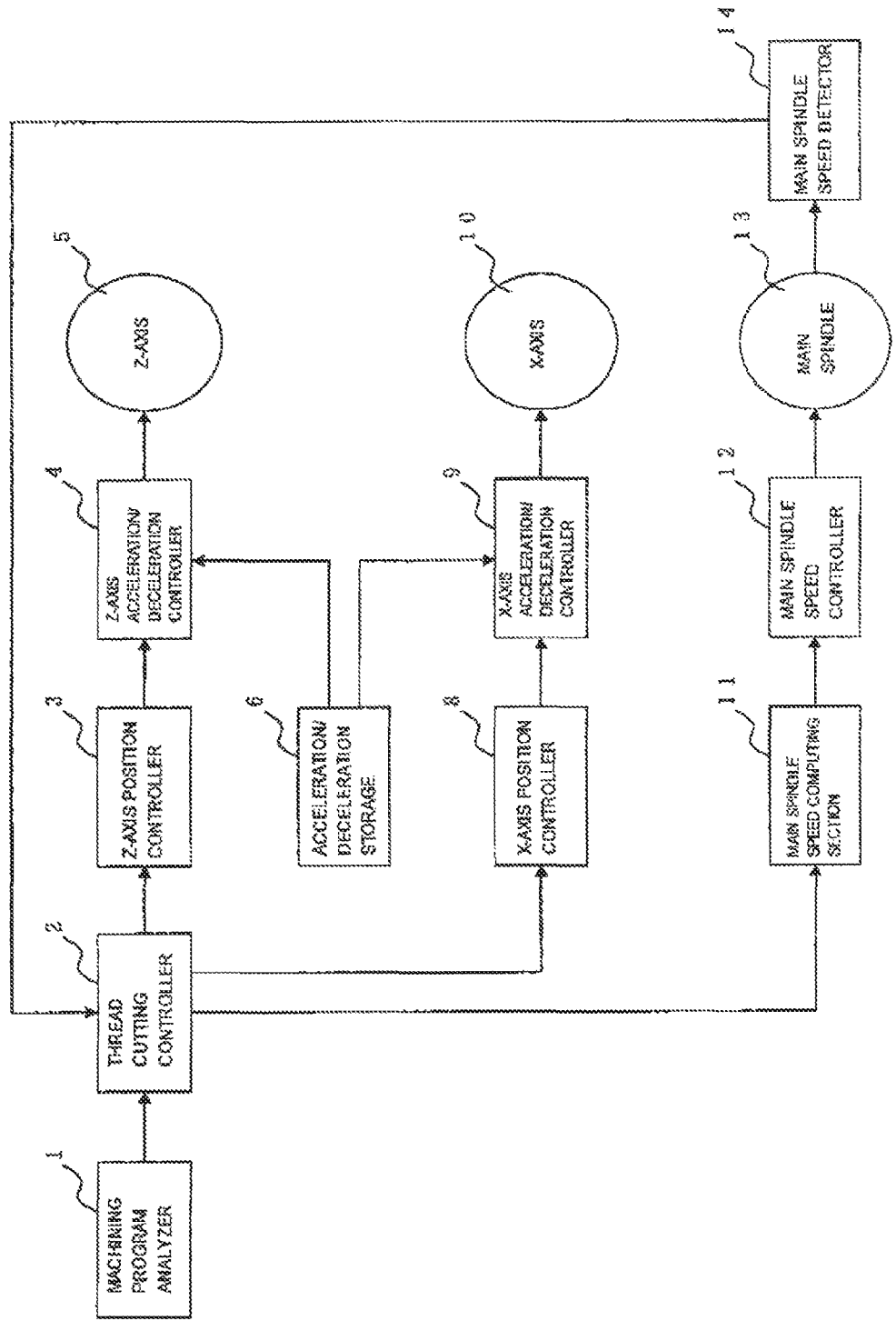
FIG. 7 is a block diagram showing a conventional structure of the thread cutting machine.

Firstly, a conventional technique is described. FIG. 7 is a block diagram of a conventional thread cutting machine. In this thread cutting machine, a machining program analyzer 1 analyzes a machining program (not shown). When a thread cutting instruction is received during the machining program, a thread cutting controller 2 outputs a currently effective instruction S for the rotational speed of a main spindle to a main spindle speed computing section 11. Based on the input of the instruction S for the rotational speed of the main spindle, the main spindle speed computing section 11 computes the rotation speed of the main spindle for each thread cutting pass and outputs it to a main spindle speed controller 12. The main spindle speed controller 12 controls a main spindle 13 so that it rotates at the input rotation speed of the main spindle. For example, the main spindle speed computing section 11 computes a high rotation speed $S_H$ and a low rotation speed $S_L$ based on equations 1 and 2 below, and changes the rotation speed of the main spindle to either the high rotation speed or the low rotation speed for each thread cutting pass to suppress chattering vibrations.

$$S_H = S + 0.5 \times S \qquad \text{Equation 1}$$

$$S_L = S - 0.5 \times S \qquad \text{Equation 2}$$

Figure 2A:
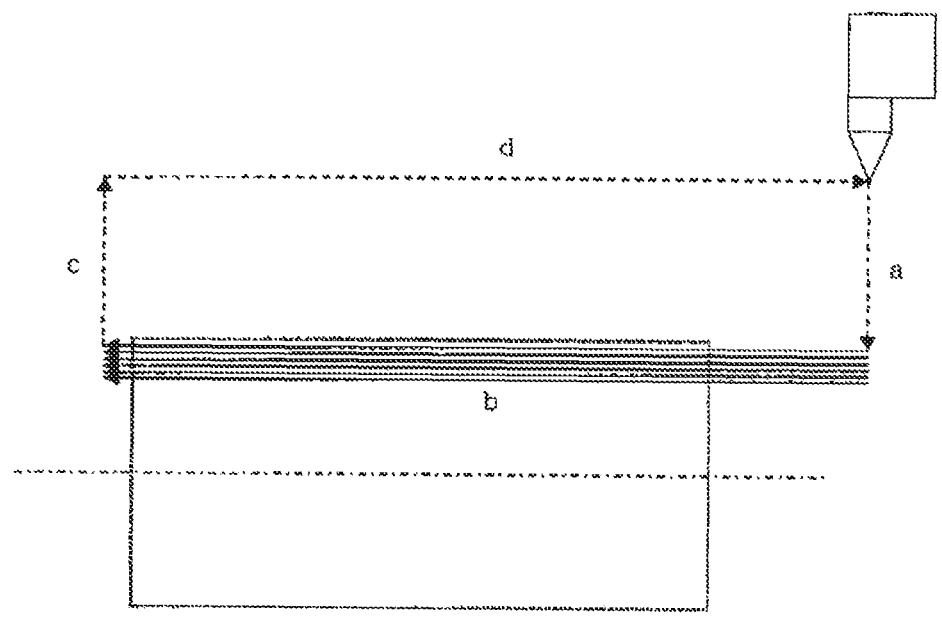
FIG. 2A is a conceptual view of a thread cutting pass.
Figure 2B:
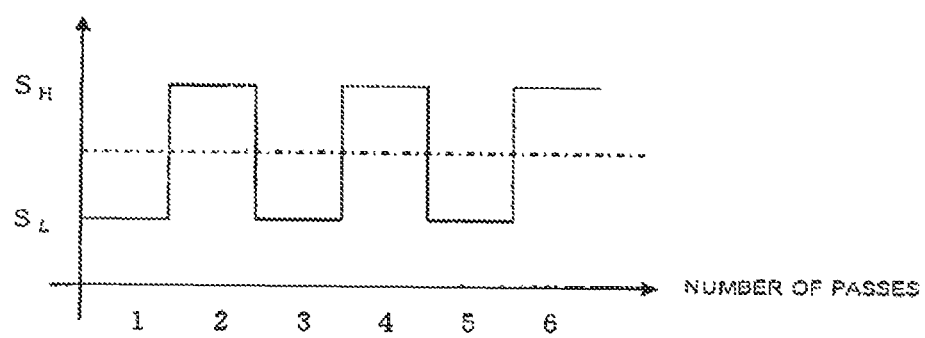
FIG. 2B is an explanatory view of an example of rotation speed of the main spindle for each pass.

FIG. 2A is an explanatory view of an example of a thread cutting pass and the rotation speed of the main spindle in each pass. To cut a thread, a tool is moved relative to a workpiece, as shown in FIG. 2A, while the workpiece is rotated. One cycle of thread cutting operation proceeds from an operation a to operations b, c, and d, in this order, where a portion b indicated by a solid line shows the operation according to the thread cutting instruction and becomes a thread cutting pass. FIG. 2A shows an example of cutting a thread by performing of thread cutting six times. As shown in FIG. 2B, the main spindle speed computing section 11 assumes the rotation speed of the main spindle in odd-number thread cutting passes to be the low rotation speed $S_L$, and the rotation speed of the main spindle in even-number thread cutting passes to be the high rotation speed $S_H$.

Subsequently, the thread cutting controller 2 computes a feed axis speed according to a thread pattern included in the thread cutting instruction, a thread pitch instruction and the like, and the current rotation speed of the main spindle obtained from a main spindle speed detector 14. A Z-axis position controller 3 controls the Z-axis by creating a Z-axis positional instruction for cutting a thread at a predetermined thread pitch in synchronism with the rotation of the main spindle based on the thread pattern, the thread pitch, the speed of the feed axis, and so on. An X-axis position controller 8 creates a positional instruction of an X-axis that is a thread cutting axis. The positional instructions of the position-controlled X-axis and Z-axes are used in acceleration/deceleration control by an X-axis acceleration/deceleration controller 9 and a Z-axis acceleration/deceleration controller 4 to control an X-axis 10 and a Z-axis 5. An acceleration/deceleration time that has been set and stored in an acceleration/deceleration time storage 6 is already transferred to the X-axis acceleration/deceleration controller 9 and the Z-axis acceleration/deceleration controller 4.

As described above, the chattering vibrations can be suppressed during thread cutting by changing the rotation speed of the main spindle.

Figure 1:
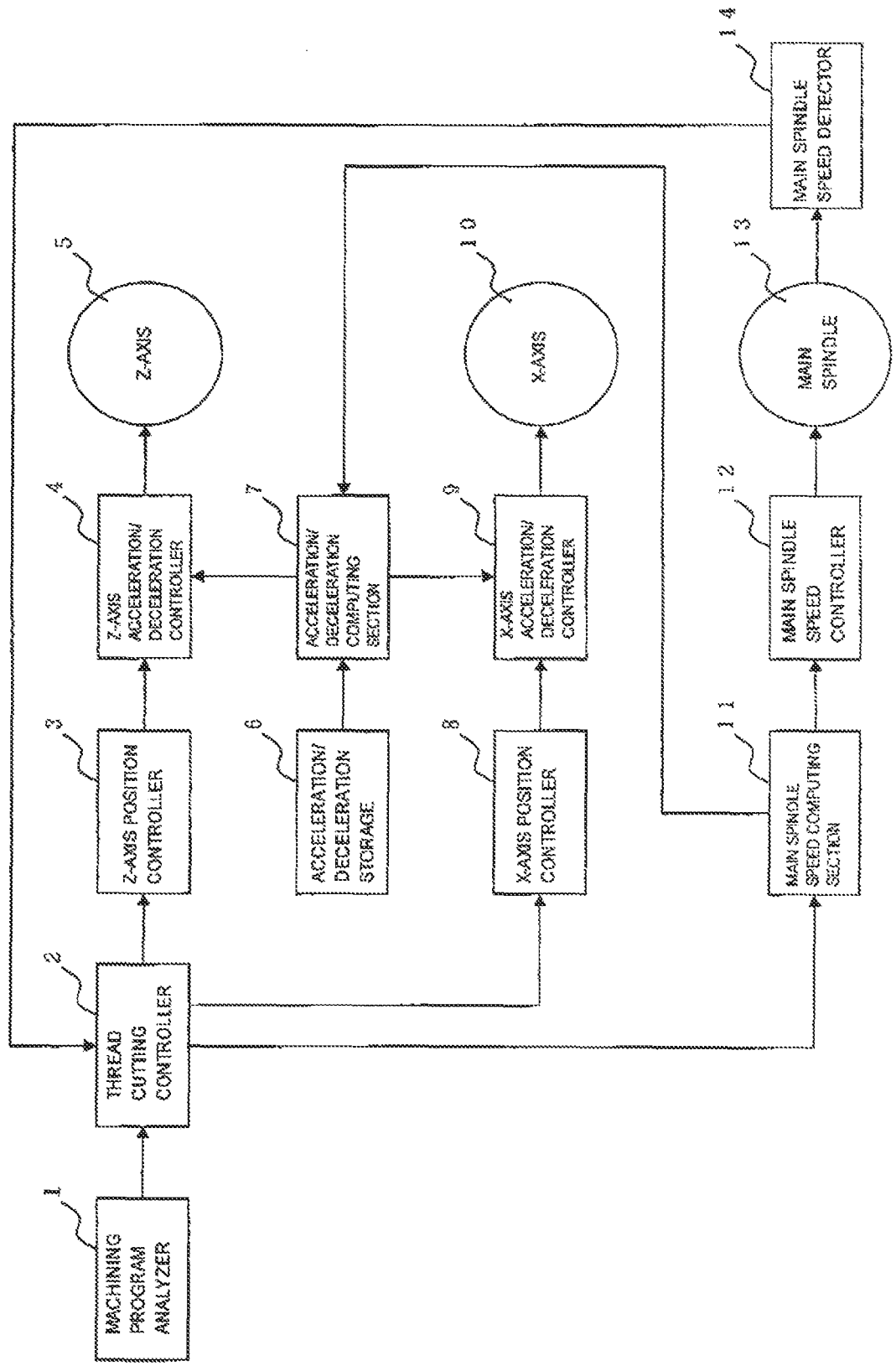
FIG. 1 is a block diagram showing a structure of a thread cutting machine according to an embodiment of the present invention.

Next, an embodiment of the present invention will be described. FIG. 1 is a block diagram showing a structure of a thread cutting machine according to the embodiment of the present invention. This thread cutting machine is characterized in that an acceleration/deceleration computing section 7 is included.

In this thread cutting machine, rotation control of the main spindle is carried out similarly to the conventional technique. Specifically, the machining program analyzer 1 analyzes a machining program (not shown). When a thread cutting instruction is received, the thread cutting controller 2 outputs a currently effective instruction S of the rotational speed of the main spindle to the main spindle speed computing section 11. Based on the input of the instruction S of the rotational speed of the main spindle, the main spindle speed computing section 11 computes the rotation speed of the main spindle for each thread cutting pass and outputs it to the main spindle speed controller 12. The main spindle speed controller 12 controls the main spindle 13 so that it rotates at the input rotation speed of the main spindle. For example, the main spindle speed computing section 11 computes a high rotation speed $S_H$ and a low rotation speed $S_L$ based on the above equations 1 and 2, and changes the rotation speed of the main spindle to either the high rotation speed or the low rotation speed for each thread cutting pass to suppress the chattering vibrations.

In this embodiment, the rotation speed of the main spindle computed in the main spindle speed computing section 11 is also sent to the acceleration/deceleration time computing section 7. The acceleration/deceleration time computing section 7 computes an acceleration/deceleration time T when a constant amount of acceleration/deceleration delay of the feed axis is given for each thread cutting pass, according to the input rotation speed of the main spindle and the acceleration/deceleration time T0 that has been set and stored previously in the acceleration/deceleration storage 6, and sends the time T to the X-axis acceleration/deceleration controller 9 and the Z-axis acceleration/deceleration controller 4.

Subsequent operations are similar to those in the conventional technique. Specifically, the thread cutting controller 2 computes a feed axis speed according to a thread pattern included in the thread cutting instruction, a thread pitch instruction and the like, and the current rotation speed of the main spindle obtained from a main spindle speed detector 14. The Z-axis position controller 3 controls the Z-axis by creating a Z-axis positional instruction for cutting a thread at a predetermined thread pitch in synchronism with the rotation of the main spindle based on the thread pattern, the thread pitch, the speed of the feed axis, and so on. The X-axis position controller 8 creates a positional instruction of the X-axis that is a thread cutting axis. The positional instructions of the position-controlled X-axis and Z-axes are used in acceleration/deceleration control by the X-axis acceleration/deceleration controller 9 and the Z-axis acceleration/deceleration controller 4 to control the X-axis 10 and the z-axis 5.

To explain the computing processing in the acceleration/deceleration time computing section 7, a feed axis path at a part such as a connecting part of thread cutting where a thread cutting direction is changed will be described.

Figure 3:
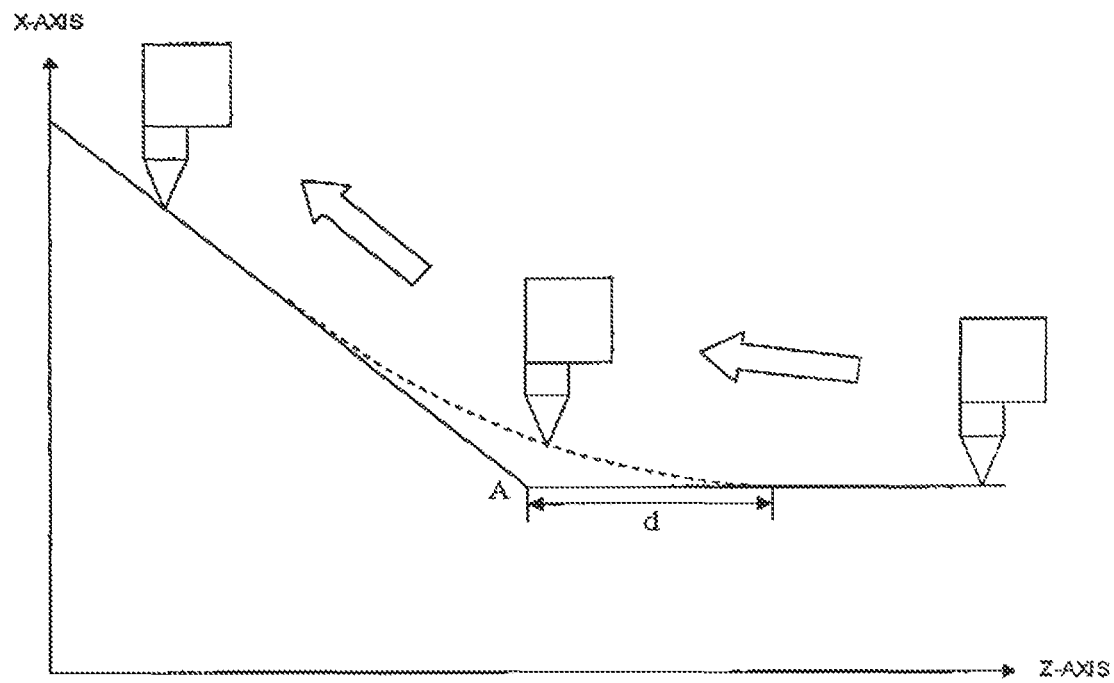
FIG. 3 is an explanatory view of a path at a connecting part between a straight thread and a tapered thread.

FIG. 3 is an explanatory view of a thread cutting path at a part where a straight thread and a tapered thread are connected. FIG. 3 is an enlarged view of the connecting part, showing both an instruction path and an actual path in a case where straight thread cutting is started in a Z-axis plus direction and switched to taper thread cutting at point A. In FIG. 3, the instruction path is indicated by a solid line and the actual path is indicated by a dotted line.

As shown in FIG. 3, the instruction path is indicated by the solid line, but the actual path becomes as indicated by the dotted line, because there is an acceleration/deceleration from the issuing of the instruction to the start of actual operation of the feed axis, so that an acceleration/deceleration delay occurs.

In the example shown in the drawing, an amount of acceleration/deceleration delay is indicated by d, and the operation of the X-axis is started before the point A by the distance d to give the actual path as shown by the dotted line. Thus, it is generally known that a direction changing part is in a partly rounded shape.

Figure 4:
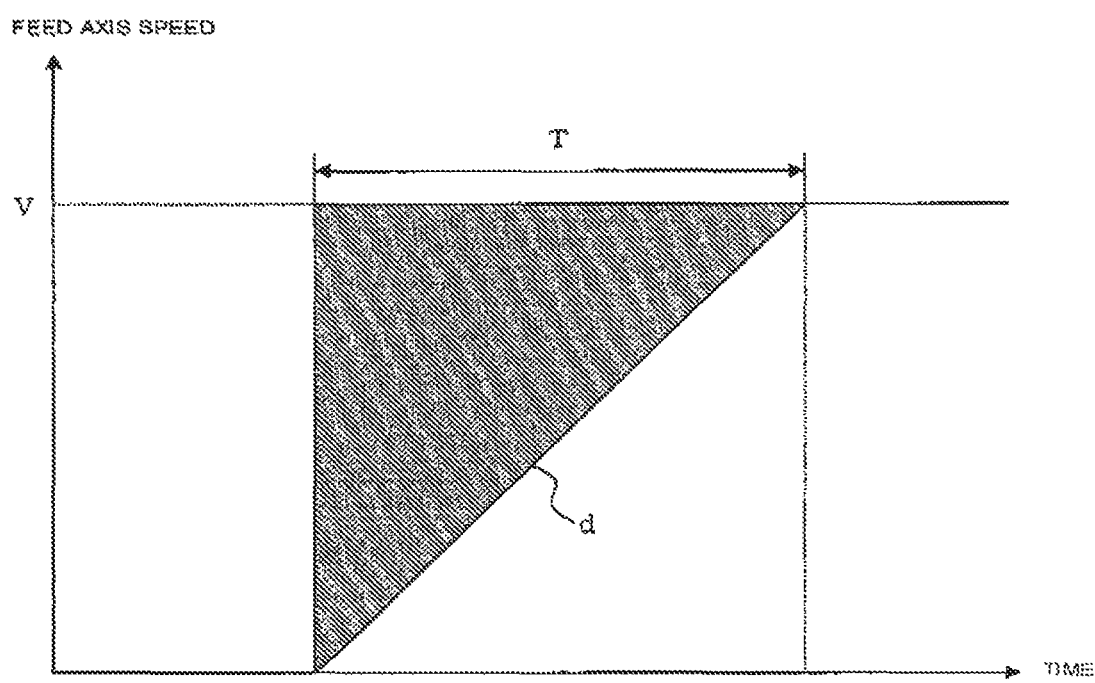
FIG. 4 is an explanatory view of an amount of acceleration/deceleration delay.

Next, the amount of acceleration/deceleration delay will be explained. FIG. 4 is an explanatory view of the amount of acceleration/deceleration delay. When an instruction of feed axis speed V is issued at a certain time, the feed axis actually reaches the feed axis speed V after an acceleration/deceleration time T has passed. In this case, the amount of acceleration/deceleration delay d equals an area indicated by hatching in the drawing and can be expressed by equation 3 below:

$$d = V \times T / 2 \qquad \text{Equation 3}$$

Figure 5:
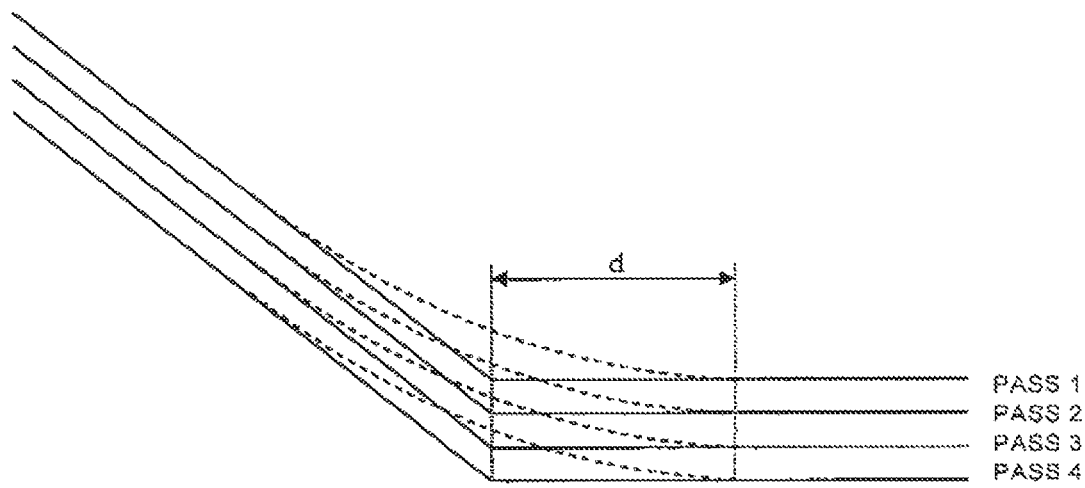
FIG. 5 is an explanatory view of a path when the same amount of acceleration/deceleration delay is provided.

Next, different paths at a direction changing part caused by differences in the amount of acceleration/deceleration delay will be explained. FIG. 5 is an explanatory view of the paths when the same amount of acceleration/deceleration delay is provided. As shown in FIG. 5, if the amount of acceleration/deceleration delay d is the same for every thread cutting pass, the cutting amount is also the same at the direction changing part.

Figure 6:
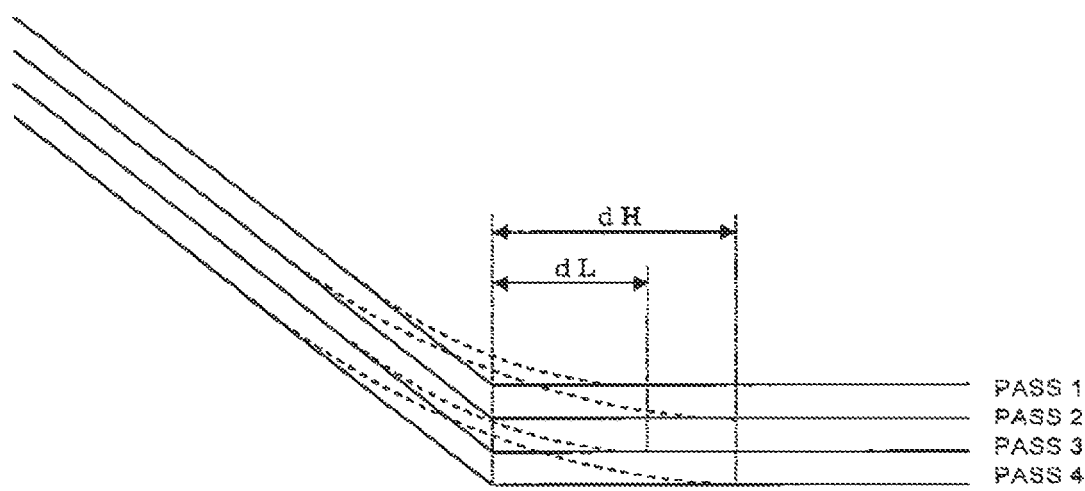
FIG. 6 is an explanatory view of a path when a different amount of acceleration/deceleration delay is provided.

FIG. 6 is an explanatory view of the paths when different amounts of acceleration/deceleration delay are provided. In the example shown in FIG. 6, the amount of odd-number-time acceleration/deceleration delays is indicated by dL, and the amount of even-number-time acceleration/deceleration delays is indicated by dH, where dL<dH. In this case, the cutting amount is not the same at the direction changing part, as shown in FIG. 6.

Therefore, to provide the same cutting amount at the direction changing part, the amount of acceleration/deceleration delay needs to be the same for all threading passes.

Since the amount of acceleration/deceleration delay is given by the above equation 3, it is sufficient that equation 4 below is satisfied to make the amount of acceleration/deceleration delay the same for all thread cutting passes:

$$V1 \times T1 = V2 \times T2 = \ldots V_{n-1} \times T_{n-1} = V_n \times T_n \quad \text{Equation 4}$$

where $V_n$ represents a feed axis speed at the nth thread cutting pass, and $T_n$ represents acceleration/deceleration time at the nth thread cutting pass.

When the above equation is applied to thread cutting, there is a proportional relationship between S and V, because a constant pitch is necessary in thread cutting, where the rotation speed of the main spindle at the nth thread cutting is $S_n$. This is represented by equation 5 below:

$$V_n = c \times S_n \quad \text{Equation 5}$$

where c represents a constant to be determined by a thread pitch. When the above equation 5 is applied to the above equation 4, equation 6 results:

$$S1 \times T1 = S2 \times T2 = \ldots S_{n-1} \times T_{n-1} = S_n \times T_n \quad \text{Equation 6}$$

Specifically, the acceleration/deceleration time is computed so as to satisfy the above equation 6 in the acceleration/deceleration time computing section 7, in order to maintain the constant amount of acceleration/deceleration delay. In other words, a constant amount of acceleration/deceleration delay can be maintained by controlling the acceleration/deceleration time so that a product of multiplication of the rotation speed of the main spindle and the acceleration/deceleration time is the same for all thread cutting passes.

In this embodiment, it is sufficient to satisfy equation 7 below, since the thread cutting is carried out by alternating the high rotation speed $S_H$ and the low rotation speed $S_L$:

$$S_H \times T_H = S_L \times T_L \quad \text{Equation 7}$$

For example, if the acceleration/deceleration time T0 is applied to the thread cutting at a high rotation speed $S_H$, and the thread cutting at a low rotation speed $S_L$, the acceleration/deceleration time $T_H$ and the acceleration/deceleration time $T_L$ are computed from equations 8 and 9 below:

$$T_H = T0 \quad \text{Equation 8}$$

$$T_L = (S_H/S_L) \times T0 \quad \text{Equation 9}$$

As described above, the rotation speed of the main spindle is changed during thread cutting to suppress the chattering vibrations. At this time, the acceleration/deceleration time of the feed axis is computed and changed based on the above equation 6 to maintain a constant amount of acceleration/deceleration delay of the feed axis, so that a constant cutting amount can be maintained at the thread-cutting-direction changing part such as the connecting part of thread cutting, and a problem of the unexpected increase of the cutting load can be solved.

In the present embodiment, the rotation speed of the main spindle is selected alternately between the high rotation speed $S_H$ and the low rotation speed $S_L$, but any pattern, such as a high-speed/instruction-speed/low-speed pattern, a change of rotation speed of the main spindle by override before thread cutting, and the like, can be adopted, as long as the rotation speed of the main spindle is unchanged in the thread cutting pass.

What is claimed is:

1. A thread cutting machine for cutting a thread by rotating a main spindle and moving a feed axis, comprising:
   a main-spindle speed computing section that computes and outputs a rotation speed of the main spindle based on a main-spindle rotation speed instruction for each thread cutting pass; and
   an acceleration/deceleration time computing section that computes and outputs an acceleration/deceleration delay time of the feed axis for each thread cutting pass so that a product of multiplication of the acceleration/deceleration delay time of the feed axis and the rotation speed of the main spindle is the same for all thread cutting passes.

* * * * *